US006883820B2

(12) United States Patent
Freeman

(10) Patent No.: US 6,883,820 B2
(45) Date of Patent: Apr. 26, 2005

(54) OFFSET COUPLER FOR GOOSENECK TRAILER

(75) Inventor: John G. Freeman, Chanute, KS (US)

(73) Assignee: PopUp Industries, Inc., Chanute, KS (US)

( * ) Notice: Subject to any disclaimer, the term of this patent is extended or adjusted under 35 U.S.C. 154(b) by 0 days.

(21) Appl. No.: 10/271,028

(22) Filed: Oct. 15, 2002

(65) Prior Publication Data

US 2004/0070171 A1 Apr. 15, 2004

(51) Int. Cl.[7] ............................................... B62D 53/06
(52) U.S. Cl. ............................... 280/441.2; 280/425.2; 280/406.2
(58) Field of Search ..................... 280/441.2, 425.2, 280/405.1, 406.2, 482, 496, 511

(56) References Cited

U.S. PATENT DOCUMENTS

| 2,628,106 | A | | 2/1953 | Sturwold |
| 3,406,852 | A | | 10/1968 | Winckler |
| 3,433,503 | A | | 3/1969 | Davis |
| 3,756,624 | A | * | 9/1973 | Taylor ..................... 280/423.1 |
| 3,796,444 | A | | 3/1974 | Hixon |
| 3,929,353 | A | | 12/1975 | Burleson et al. |
| D243,000 | S | | 1/1977 | Carnes |
| 4,256,323 | A | | 3/1981 | McBride |
| 4,832,358 | A | | 5/1989 | Bull |
| 5,145,199 | A | | 9/1992 | Howard |
| 5,482,309 | A | | 1/1996 | Hollis |
| 5,725,234 | A | * | 3/1998 | Colibert ..................... 280/512 |
| 5,797,614 | A | | 8/1998 | Hord et al. |
| 5,890,728 | A | * | 4/1999 | Zilm ......................... 280/433 |
| 6,135,482 | A | | 10/2000 | Larkin |
| 6,186,530 | B1 | * | 2/2001 | Zilm ......................... 280/496 |
| 6,264,229 | B1 | * | 7/2001 | Gill et al. ................. 280/441.2 |
| 6,398,250 | B1 | * | 6/2002 | Hashman ................. 280/438.1 |
| 6,629,700 | B1 | | 10/2003 | Baptiste |

* cited by examiner

Primary Examiner—Avraham Lerner
(74) Attorney, Agent, or Firm—Shook, Hardy & Bacon L.L.P.

(57) ABSTRACT

An offset coupler device for coupling a gooseneck trailer with a gooseneck hitch ball is provided. The coupler has a first member spaced apart from a second member by an offset plate. A ball coupler is provided at a lower end of the second member. In use, the first member is partially received in a trailer coupler tube of the trailer and a gooseneck hitch ball is partially received in the ball coupler. The offset coupler effectively increases the relative distance between the gooseneck trailer and the tow vehicle during use.

16 Claims, 4 Drawing Sheets

US 6,883,820 B2

OFFSET COUPLER FOR GOOSENECK TRAILER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a device used to facilitate coupling a gooseneck trailer with a tow vehicle. More particularly, this invention relates to an offset coupler for use in connecting a gooseneck trailer with a gooseneck hitch ball to permit the relative spacing between the tow vehicle and the gooseneck trailer to be increased.

By virtue of their design and their ability to better distribute the weight of the towed trailer, gooseneck trailers have become quite popular and have been found to have numerous advantages over bumper pulled trailers. In a typical arrangement, the front of a gooseneck trailer projects forward from the main body of the trailer a set distance and then a downwardly projecting trailer coupler tube is provided, the appearance of this arrangement thus providing the inspiration for the gooseneck name. The lower end of the trailer coupler tube is designed to be coupled with a gooseneck hitch of the tow vehicle. The gooseneck hitch generally consists of a gooseneck hitch ball which projects upwardly from a central location of the tow vehicle, generally the floor of the bed of a truck. The gooseneck hitch ball is generally oriented in the bed of the tow vehicle slightly ahead of the rear axle, thereby giving the gooseneck trailer arrangement its advantage over bumper pull trailers by transferring the weight of the trailer more evenly between the front and rear axles of the tow vehicle.

A drawback of the gooseneck trailer hitch arrangement, having a hitch ball stick up in the middle of a truck bed, has been overcome in recent years by the advent of convertible type gooseneck hitch balls. See for example, U.S. Pat. No. 6,447,000 to Popup Industries. Newer convertible type gooseneck hitch balls must be mounted even further ahead of the rear axle in order to achieve adequate clearance between the differential of the tow vehicle and the underhang of the convertible gooseneck hitch system. As a result, the geometry of gooseneck trailer weight distribution in the tow vehicle and the special requirements of convertible hitch balls cooperate to dictate the location of the gooseneck hitch ball in the bed of the tow vehicle.

In recent years, a trend has emerged in the design of trucks to increase the interior cab space for user comfort. First introduced were stretch cab trucks, followed by extended cab trucks and, even more recently, crew cab four-door trucks. While the cabs of these trucks have in essence been lengthened, the wheel base or footprint of these pickup trucks have remained largely unchanged. As a result, the beds of these trucks are respectively shortened. This arrangement permits a truck manufacturer to provide a truck with more interior space, while not sacrificing mobility and maneuverability for the trucks. It also prevents the manufacturers from having to produce longer and longer trucks which might not be as appealing to purchasers.

The presence of these new short bed trucks have created a problem with respect to gooseneck trailers. The problem is a decrease in the clearance between the nose of a trailer and the rear of the cab of the tow vehicle when the gooseneck trailer is coupled with the tow vehicle. Because the bed is shortened, the distance between the hitch ball and the back of the cab in a short bed truck is shorter than what it would normally be in a truck with a standard length bed. Because the front of the trailer is now closer to the rear of the cab, the driver of the short bed tow vehicle cannot make as sharp of turns as the driver of a long bed vehicle, as discussed in greater detail below.

Another problem associated with gooseneck trailers in general can be the clearance between the rear of the truck and the bulkhead of the trailer. Spare tires, propane tanks or other items are often stored mounted to the outside of the bulkhead of a gooseneck trailer. As a result, the distance between the front of the trailer and the back of the truck is effectively shortened. Generally, when coupling a gooseneck trailer to a pickup truck, the tailgate of the truck is lowered so that the truck may be backed up towards the trailer until the gooseneck is positioned over the hitch ball in the bed of the tow vehicle. It is often the case that the tailgate would make contact with the item stored on the front of the bulkhead of the trailers before the coupler would be aligned over the hitch ball for coupling. As a result, it is often necessary to back the truck partially under the trailer and then raise the tailgate before being permitted to back further under the trailer for coupling.

Therefore, this is a need for a device which permits the user to couple a gooseneck trailer with a tow vehicle in an arrangement that permits the gooseneck trailer to be moved further back away from the tow vehicle than permitted by present coupler devices. The present invention fills these and other needs.

BRIEF SUMMARY OF THE INVENTION

In order to overcome the above-stated problems and limitations, and to achieve the noted objects, there is provided an offset coupler for gooseneck trailers.

In general, the offset coupler generally includes a first portion designed to be received in the trailer coupler tube of the gooseneck trailer in much the same manner as present coupler tubes. The first member is telescopingly received in the trailer coupler tube to permit a user to raise or lower the orientation of the offset coupler device depending on the height of their tow vehicle in relation to the height of the forward most portion of the gooseneck trailer.

A lower or second portion of the offset coupler device is provided in a spaced apart or offset relationship with respect to the first portion. The first and second portions are connected by an offset plate oriented in a generally horizontal position. Brackets strengthen the connection and assist in transferring downward weight of the nose of the gooseneck trailer to the hitch ball in use. The lower most end of the second portion is provided with a ball coupler to permit the user to selectively couple the offset coupler with the gooseneck hitch ball of the tow vehicle.

Further objects, features, and advantages of the present invention over the prior art will become apparent from the detailed description of the drawings which follows, when considered with the attached figures.

DETAILED DESCRIPTION OF THE INVENTION

Figure 1:
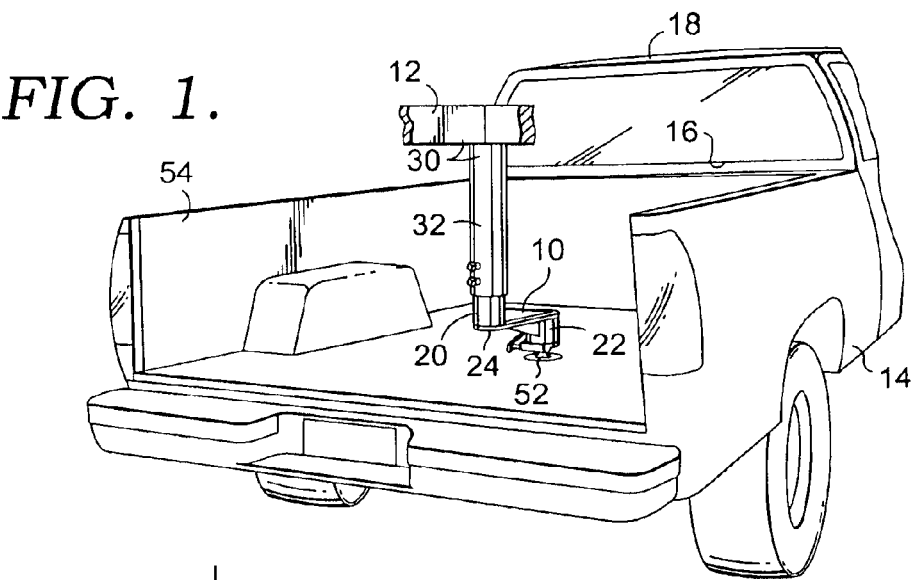
FIG. 1 is a perspective view of an offset coupler of the present invention in use with a portion of the gooseneck trailer omitted for clarity.

Referring now to the drawing in detail, and initially to FIG. 1, numeral 10 generally designates an offset coupler device of the present invention. The device 10 permits a user to couple a gooseneck trailer 12 with a tow vehicle 14 in a manner that increases the distance between the gooseneck trailer and the rear 16 of a cab 18 of the tow vehicle 14. The offset coupler 10 has a first member 20 and a second member 22. The first and second members 20, 22 are spaced apart from one another and are coupled by an offset plate 24.

Figure 2:
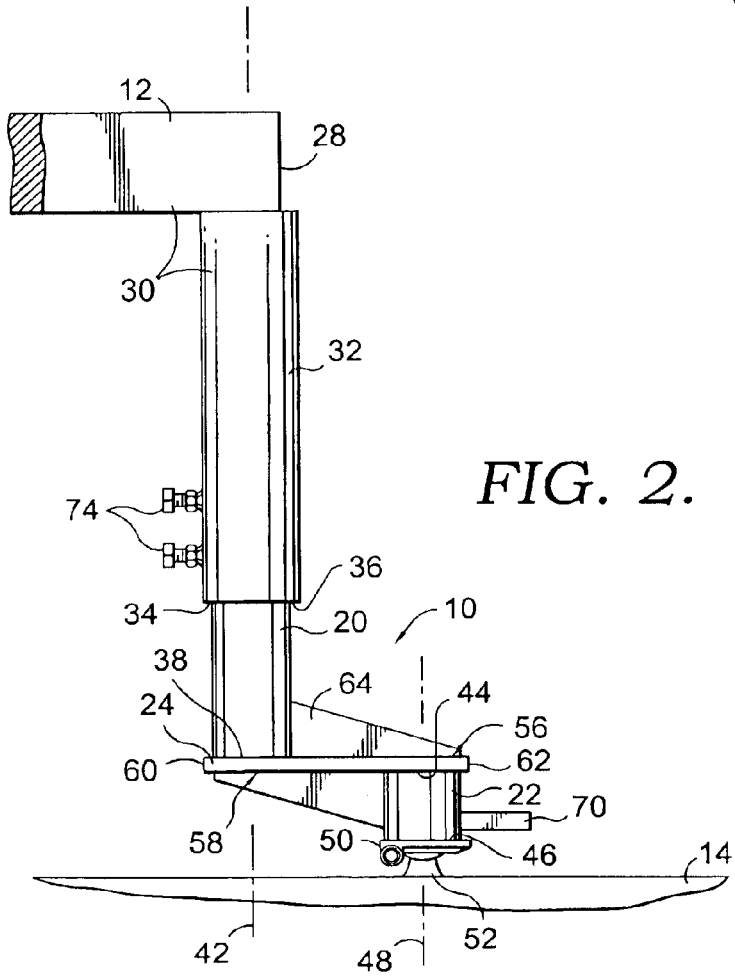
FIG. 2 is a side elevational view of the offset coupler of FIG. 1.
Figure 9:
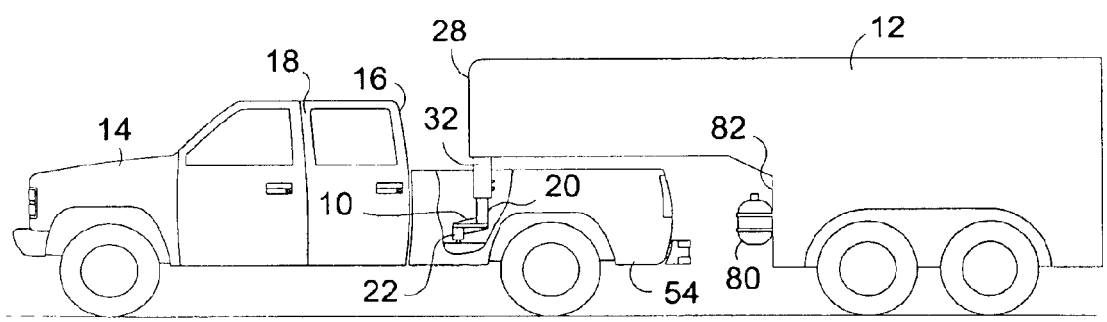
FIG. 9 is a schematical side elevational view of a gooseneck trailer coupled with a short bed tow vehicle via an offset coupler of the present invention with a portion of the bed of the tow vehicle cut away for clarity.

Referring now to FIG. 9, gooseneck trailers generally have a body 26 and, near their front end 28, have a gooseneck 32. In some trailers, such as the trailer illustrated in FIG. 9, the trailer body 26 comes farther forward and the gooseneck 30 is less defined than in other gooseneck trailers, such as the one illustrated in FIGS. 1–3. With reference now also to FIG. 2, gooseneck trailers have a trailer coupler tube 32 adjacent the front end 28. Trailer coupler tubes generally depend downwardly from the front end 28 of the gooseneck trailer 12. Trailer coupler tubes are generally round, but can be of varying cross-sections, including rectangular. The trailer coupler tube 32 has an opening 34 at the lower end 36 to receive a portion of a hitch coupler tube.

Prior art hitch coupler tubes (not illustrated) are generally a short piece of pipe or tubing with some sort of ball coupler at their lower end. Additionally, they have a cross-section corresponding to the cross-section of the trailer coupler tube with which they will be used and are sized for sliding, mating and telescoping receipt in the opening at the lower end of the trailer coupler tube. As a result of this arrangement, the pivot point of the trailer on the hitch ball falls on the central longitudinal axis of the trailer coupler tube 32.

In the offset coupler device 10 of the present invention, the first member 20 most closely relates to the body (i.e. the short piece of pipe or tubing) of a prior art hitch coupler tube. The first member 20 is designed to be slidingly received in the trailer coupler tube 32, is generally tubular in nature and, as with prior art devices, has a cross-section corresponding to a cross-section of the trailer coupler tube in which it is to be received and is sized for telescoping receipt in the trailer coupler tube 32. The first member 20 has a proximal end 38, which is coupled with the offset plate 24, and a distal end 40, which is received in the opening 36 in the trailer coupler tube 32. The first member 20 also includes a central longitudinal axis 42. When the first member 20 is received in the trailer coupler tube 32, the central longitudinal axis 42 of the first member 20 is in a generally vertical orientation, as the trailer coupler tube 32 is also in a generally vertical orientation, and is coaxial with the central longitudinal axis of the trailer coupler tube 32.

The second member 22 also has a proximal end 44, a distal end 46 and a central longitudinal axis 48. The proximal end 44 of the second member 22 is connected to the offset plate 24. A ball coupler 50 is connected to the distal end 46 of the second member. The ball coupler 50 facilitates coupling and uncoupling the offset coupler device 10 to a gooseneck hitch ball 52 mounted in a bed 54 of the tow vehicle 14. The longitudinal axes 42, 48 are generally spaced apart from one another and are generally parallel. The greater the distance between the longitudinal axes 42, 48, the greater the offset achieved by the offset coupler device 10 of the present invention and the greater the trailer 12 is spaced apart from the tow vehicle 14. While the distance can be varied, a distance of approximately 9 inches between the axes 42, 48 has been found to be beneficial.

Figure 4:
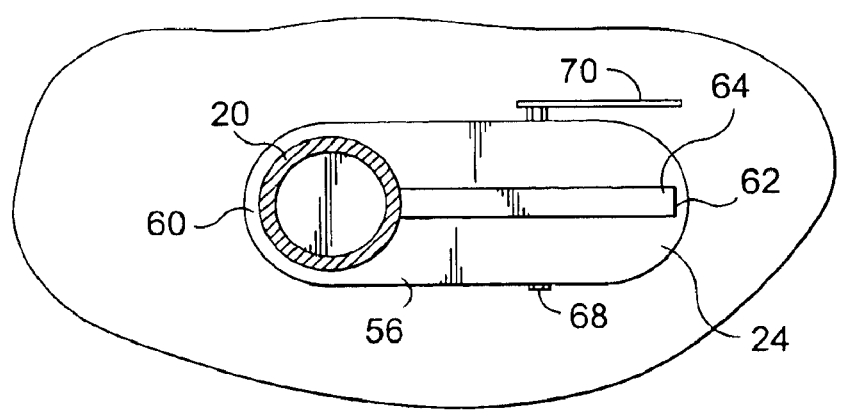
FIG. 4 is a plan view of the offset coupler of FIG. 1 taken generally along the line 4—4 in FIG. 3.

As illustrated in FIG. 4, the offset plate 24 is generally oval in shape. The offset plate has a top surface 56 and a bottom surface 58. The proximal end 38 of the first member 20 is generally welded to the top surface 56 of the offset plate 24 near a rear end 60 and the proximal end 44 of the second member 22 is generally welded to the bottom surface 58 of the offset plate near a forward end 62. Brackets 64 help couple the members 20, 22 with the offset plate 24 and assist in transferring the downward weight of the trailer from the gooseneck 30 to the hitch ball 52.

Figure 5:
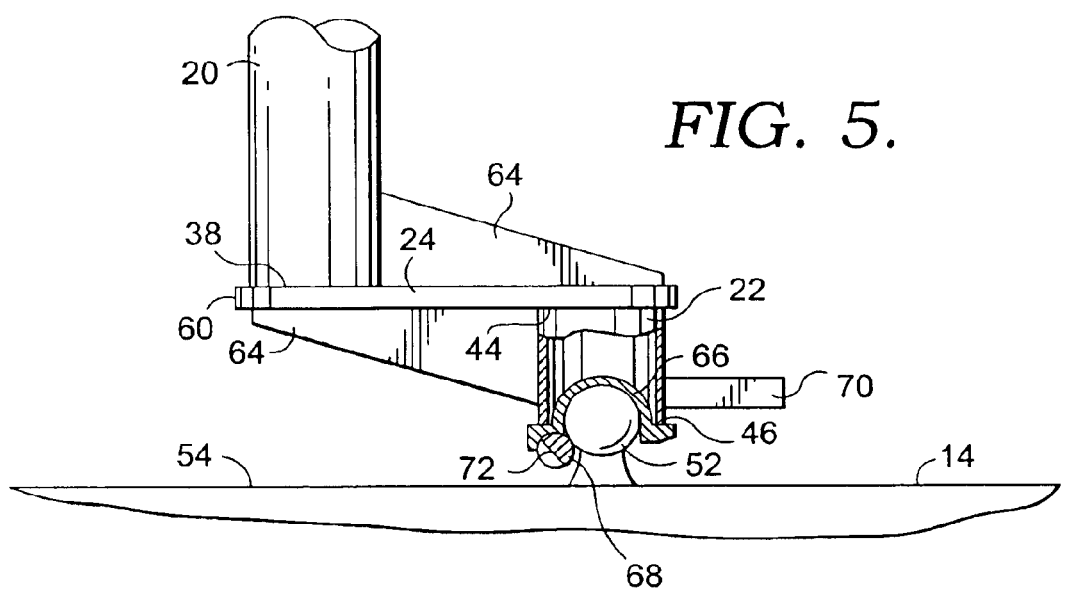
FIG. 5 is a partial side elevational view of the offset coupler of FIG. 1 with a portion of the second member cut away and illustrating the ball coupler in an unlocked position.
Figure 6:
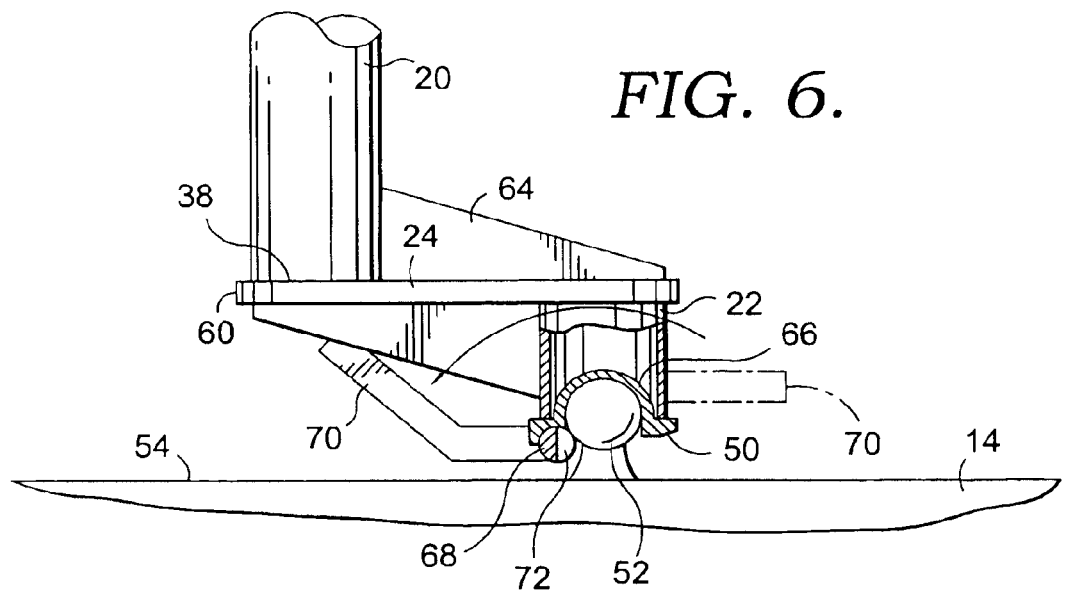
FIG. 6 is a partial side elevational view of the offset coupler of FIG. 1 with a portion of the second member cut away and illustrating the ball coupler in a locked position.

The ball coupler 50 is a typical type known in the art. It should be noted, that while the offset coupler device 10 of the present invention is illustrated with a particular type of ball coupler, as best illustrated in FIGS. 5 and 6, any number of standard ball coupler devices could be used as part of the present invention. The ball coupler 50 includes a shell or a dome portion 66 that is partially received up in the distal end 46 of the second member 22. A generally horizontal shaft 68 runs transverse to the hitch ball 52 and is coupled on one end with a handle 70. The shaft includes a flattened portion 72, as illustrated in FIG. 5. When the handle 70 is in a horizontal, locked or down position, the flattened portion 72 of the shaft 68 faces away from the hitch ball 52 and thereby couples the trailer 12 with the tow vehicle 14 by preventing the hitch ball 52 from being removed from the shell 66 of the ball coupler 50. As illustrated in FIG. 6, when the handle 70 is rotated to the open position, the flattened portion 72 of the shaft 68 faces the hitch ball 52 and permits the hitch ball 52 to be freely moved in an out of engagement with the shell 66 of the ball coupler 50.

In use, a user slides the first member 20 up in the opening 34 of the trailer coupler tube 32. Most likely, the first member 20 is received in the trailer coupler tube 32 as far as possible and a bolt 74 is tightened to prevent movement of the offset coupler device 10 with respect to the trailer coupler tube 32. The user then backs their tow vehicle under the gooseneck 30 of the trailer 12 until the hitch ball 52 is located directly under the second member 22. The user then loosens the bolt 74 to permit the offset coupler device 10 to be lowered until the hitch ball 52 is received in the shell 66 of the ball coupler 50, as illustrated in FIG. 6. The handle 70 is then rotated to the locked position, as illustrated in FIG. 5, and the bolt 74 is re-tightened.

Figure 3:
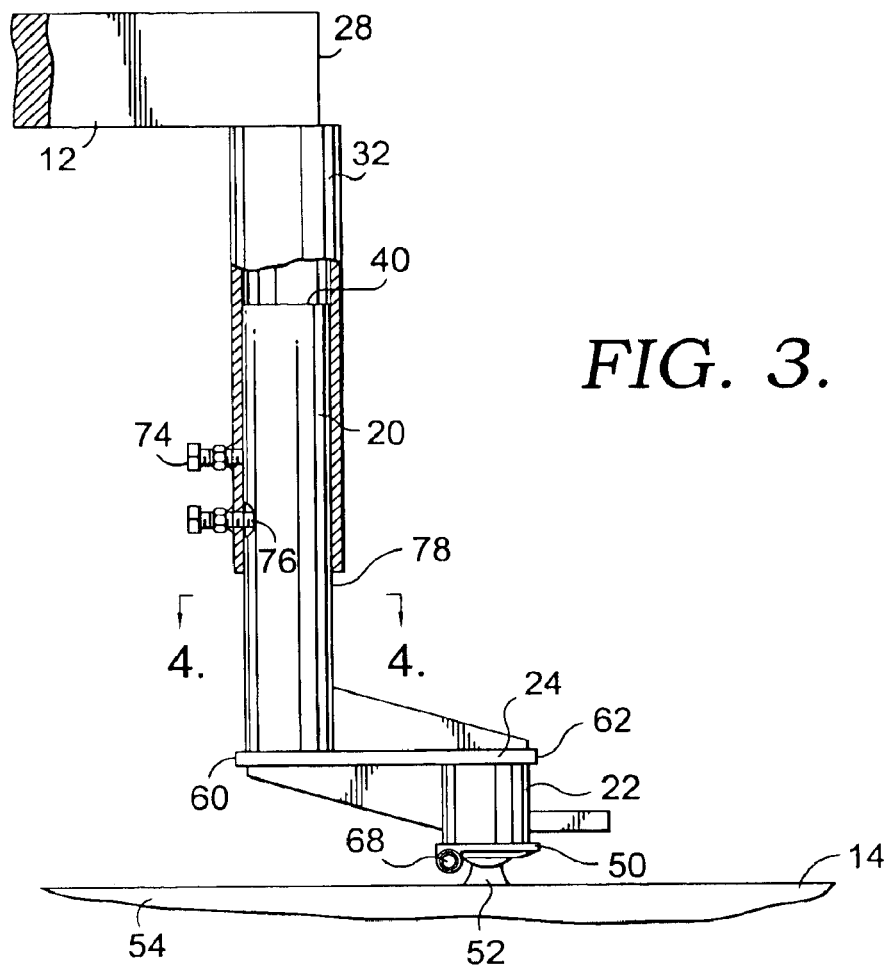
FIG. 3 is a side elevational view of the offset coupler of FIG. 1 with a portion of the trailer coupler tube cut away for clarity.

Generally, standard trailer coupler tubes of gooseneck trailers include two bolts therein to permit a user to fix the location of prior art hitch coupler tubes with respect to the trailer coupler tube once the correct relationship has been determined. In these prior art arrangements, as the central longitudinal axis of the hitch coupler tube was coaxial with the central longitudinal axis of the trailer coupler tube and was also positioned directly over the center of the hitch ball, the purpose of the bolts were primarily to prevent the hitch coupler tube from sliding up and down in the trailer coupler tube during use. Because of the pivot point of the trailer being directly below the trailer coupler tube, the bolts were not required to resist rotational forces to prevent the hitch coupler tube from rotating in the trailer coupler tube. In the present invention, however, because the pivot point of the trailer (still directly above the hitch ball) is now located forward of the central longitudinal axis of the trailer coupler tube, as the tow vehicle 14 turns, rotational forces will more than likely be applied to the bolts 74 as the first member 20 tries to rotate in the trailer coupler tube 32. Accordingly, while simply tightening the two bolts 74 has been found satisfactory, a user may wish to provide a transverse flattened portion 76 on an outer surface 78 of the first member 20 in a location where one (or both) of the bolts 74 will come in contact with the first member 20 when the offset coupler device 10 is coupled with the tow vehicle 14, as illustrated in FIG. 3. Alternatively, a user may simply bore a hole (not shown) in the first member at a point where the bolt 74 would otherwise contact the outer surface 78. This would permit the bolt to be countersunk in the first member 20. The bolts 74 permit the user to adjust the relationship between the offset coupler device 10 and the trailer coupler tube 32 of the trailer to permit tow vehicles of varying heights to be used to tow the same trailer.

Figure 7:
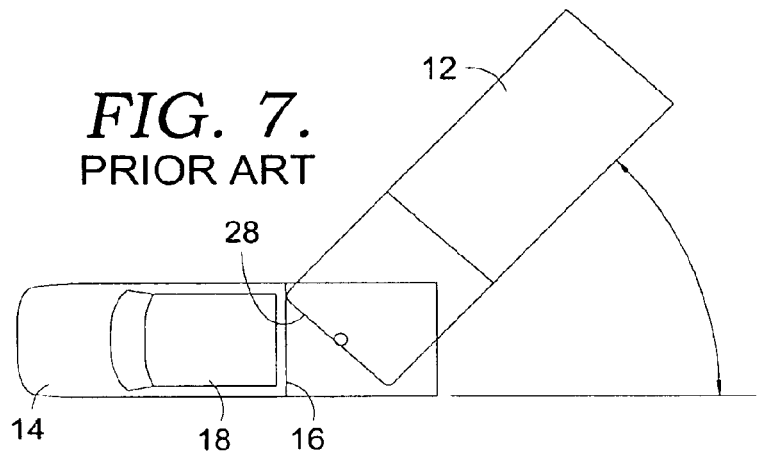
FIG. 7 is a schematical plan view of a gooseneck trailer coupled with a short bed tow vehicle via a standard hitch coupler tube.
Figure 8:
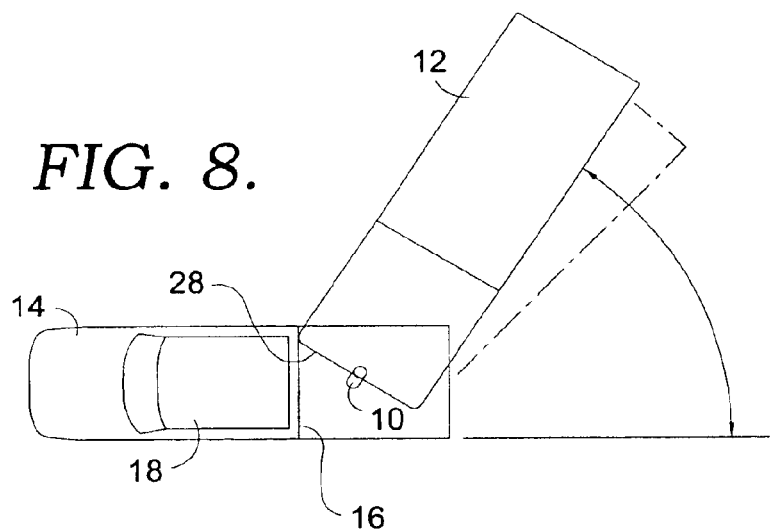
FIG. 8 is a schematic plan view of the gooseneck trailer of FIG. 7 coupled with the short bed tow vehicle of FIG. 7 via an offset coupler of the present invention and illustrating an increased turn angle permitted thereby.

Turning now to FIGS. 7 and 8, FIG. 7 illustrates a gooseneck trailer 12 having a prior art hitch coupler tube being towed by a tow vehicle 14 with a short bed 54. FIG. 7 illustrates the maximum turn angle that could be achieved when the tow vehicle is pulling or backing the trailer 14 before the front end 28 of the trailer 12 would impact with the rear 16 of the cab 18. In contrast, FIG. 8 illustrates that a greater turning angle may be achieved by moving the trailer further back from the tow vehicle by using the offset coupler 10 of the present invention.

FIG. 9 illustrates the common situation discussed above where users store items 80 (e.g. propane tanks) on the bulkhead 82 of the trailer 12. As illustrated, the offset coupler device 10 of the present invention not only moves the front end 28 of the trailer 12 further away from the rear 16 of the cab, but also moves the bulkhead 82 further away from a rear of the bed 54 of the tow vehicle 14. As discussed above, this arrangement would permit a user to back the tow vehicle 14 under the gooseneck 30 until the hitch ball 52 is located directly below the second member 22 with a tailgate (not shown) in a down position and, thereby, not have to worry about the tailgate impacting the stored item 80.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An offset coupler device for use in connection with a gooseneck trailer, the coupler comprising:
   a first portion, the first portion having a proximal end and a longitudinal axis, the longitudinal axis being in a generally vertical orientation;
   a second portion, the second portion having a proximal end and a longitudinal axis, the longitudinal axis of the second portion being in a substantially vertical orientation, wherein the longitudinal axis of the first portion and the longitudinal axis of the second portion are generally parallel and non-coaxial;
   a connector intermediate the first portion and the second portion, the connector coupling the first portion with the second portion wherein the connector has an upper surface and a lower surface, wherein the proximal end of the first portion is fixed to the upper surface of the connector and wherein the proximal end of the second portion is fixed to the lower surface of the connector; and
   a ball coupler connected to the second portion, whereby the second portion of the offset coupler may be coupled with a gooseneck hitch ball of a tow vehicle via the ball coupler and whereby the first portion may be coupled with a gooseneck trailer.

2. The coupler of claim 1, wherein the first portion and the second portion are generally tubular in nature and each have proximal and distal ends.

3. The connector of claim 2, wherein the connector is generally plate-like in nature.

4. The connector of claim 1, wherein the connector is generally plate-like in nature.

5. The coupler of claim 1, wherein the ball coupler includes a shell having a concave portion designed to receive a portion of a gooseneck hitch ball, a shaft adjacent the concave portion and a handle coupled with the shaft to selectively move the shaft between first and second positions.

6. The coupler of claim 5, wherein the second portion is generally tubular in nature and has proximal and distal ends and wherein the ball coupler is connected to the distal end of the second portion.

7. The coupler of claim 6, wherein the concave portion is partially received in the distal end of the second portion.

8. The coupler of claim 5, wherein the shaft includes a flattened portion, wherein the flattened portion faces the longitudinal axis of the second portion when in the first position and wherein the flattened portion faces away from the longitudinal axis of the second portion in the second position.

9. An offset coupler device for use in connecting a gooseneck trailer with a gooseneck trailer hitch of a tow vehicle, the gooseneck trailer having a trailer coupler tube with a central longitudinal axis in a generally vertical orientation and having an inner dimension defining an interior space, the offset coupler comprising:
   a first generally elongate member having a central longitudinal axis, such axis being in a generally vertical orientation, the first member having a proximal end and a distal end and being sized for telescoping engagement with the trailer coupler tube;

a second member having a central longitudinal axis, the central longitudinal axis of the second member being in a generally vertical orientation, being non-coaxial with the central longitudinal axis of the first member and being generally parallel to the central longitudinal axis of the first member, the second member further having a distal end and a proximal end;

a connector located intermediate the first and second members, the connector coupling the first member with the second member wherein the connector has an upper surface and a lower surface, wherein the proximal end of the first member is connected to the upper surface of the connector and wherein the proximal end of the second member is connected to the lower surface of the connector; and a ball coupler, the ball coupler being connected to the distal end of the second member and being designed to receive and couple the offset coupler device with die gooseneck hitch of the tow vehicle.

10. The coupler of claim 9, wherein the upper and lower surfaces of the connector are generally parallel to one another and are planar in nature.

11. The coupler of claim 10, wherein the first member is generally perpendicular to the connector and wherein the second member is generally perpendicular to die connector.

12. The connector of claim 11, wherein the central longitudinal axis of the first member is approximately 9 inches away from the central longitudinal axis of the second member.

13. An offset coupler device for connecting a gooseneck trailer with a gooseneck hitch of a tow vehicle, the gooseneck trailer having a coupler tube in a generally vertical orientation, the coupler tube having an opening at the lower end defined by an interior diameter, the opening designed to receive a portion of the offset coupler device, the offset coupler device comprising:

a first member having a central longitudinal axis oriented in a generally vertical orientation, the first member being generally tubular in nature and having a proximal end and a distal end, the distal end being designed to be slidingly and telescopingly received in the opening in the coupler tube of the gooseneck trailer, the first member having an outer diameter slightly less than the inner diameter of the coupler tube of the gooseneck trailer;

a second member having a central longitudinal axis oriented in a general vertical orientation, the longitudinal axis of the first and second members being generally parallel, the second member being generally tubular in nature and having a proximal end and a distal end;

an offset connector plate having an upper surface and a lower surface, wherein the upper surface is connected to the proximal end of the first member and the lower surface is connected to the proximal end of the second member; and a ball coupler connected to the distal end of the second member, the ball coupler designed to selectively receive the gooseneck hitch of the tow vehicle and to couple the offset coupler device with the tow vehicle.

14. The device of claim 13, further comprising:

a first bracket, the first bracket being connected to the first member and to the upper surface of the connector plate.

15. The coupler of claim 14, further comprising:

a second bracket, the second bracket being connected to the second member and to the lower surface of the connector plate and wherein the first and second brackets reinforce the connections between the first and second member and the connector plate.

16. A method of increasing the relative spacing between a gooseneck trailer and its tow vehicle, a method comprising:

obtaining a gooseneck trailer having a trailer coupler tube with a central longitudinal axis in a generally vertical orientation adjacent the forward end of the gooseneck trailer; obtaining a tow vehicle having a gooseneck hitch ball projected upwardly from a surface thereon;

obtaining an offset coupler device having a first member with a central longitudinal axis spaced apart from a second member having a central longitudinal axis by an offset plate, wherein the longitudinal axis of the first member is generally parallel to the longitudinal axis of the second member, and wherein a hitch ball coupler is connected to a distal end of the second member;

connecting the offset coupler with the gooseneck trailer by receiving the first member in the trailer coupler tube; and coupling the trailer with the tow vehicle by receiving the hitch ball in the ball coupler tube, wherein the hitch ball is spaced apart from the central longitudinal axis of the trailer coupler tube.

\* \* \* \* \*